United States Patent [19]

Morita et al.

[11] Patent Number: 4,621,115

[45] Date of Patent: Nov. 4, 1986

[54] GLASS FIBER REINFORCED POLYPROPYLENE COMPOSITIONS COMPRISING CRYSTALLINE E-P BLOCK COPOLYMER GRAFT MODIFIED WITH ITACONIC ANHYDRIDE

[75] Inventors: Hideyo Morita; Tomohiko Akagawa; Yasuo Kita, all of Sakai, Japan

[73] Assignee: Ube Industries, Ltd., Ube, Japan

[21] Appl. No.: 725,580

[22] Filed: Apr. 22, 1985

[30] Foreign Application Priority Data

Apr. 27, 1984 [JP] Japan .................... 59-84146

[51] Int. Cl.$^4$ .................... C08K 9/06; C08K 3/40
[52] U.S. Cl. .................... 524/494; 524/504; 524/505; 523/214
[58] Field of Search .................... 524/494, 504, 505; 523/214

[56] References Cited

U.S. PATENT DOCUMENTS

| 4,278,586 | 7/1981 | Marzola et al. | 524/285 |
| 4,387,188 | 6/1983 | Statz | 524/504 |
| 4,412,616 | 10/1983 | Fukui et al. | 524/505 |
| 4,477,617 | 10/1984 | Murphy | 524/505 |
| 4,480,065 | 10/1984 | Kawai | 524/505 |

FOREIGN PATENT DOCUMENTS

| 8054 | 1/1977 | Japan . | |
| 0037036 | 3/1983 | Japan | 524/494 |

*Primary Examiner*—Herbert J. Lilling
*Attorney, Agent, or Firm*—Frishauf, Holtz, Goodman & Woodward

[57] ABSTRACT

A glass fiber reinforced polypropylene composition comprising 50 to 85% by weight of a crystalline ethylene-propylene block copolymer which has been graft-modified with itaconic anhydride, 5 to 45% by weight of a glass fiber and 3 to 20% by weight of a polyolefin rubber which has been graft-modified with an unsaturated carboxylic acid (100% by weight in total).

20 Claims, No Drawings

GLASS FIBER REINFORCED POLYPROPYLENE COMPOSITIONS COMPRISING CRYSTALLINE E-P BLOCK COPOLYMER GRAFT MODIFIED WITH ITACONIC ANHYDRIDE

BACKGROUND OF THE INVENTION

The present invention relates to a glass fiber reinforced polypropylene composition, more specifically to a glass fiber reinforced polypropylene composition which has improved rigidity at elevated temperature, shock-resistance, appearance and coating-ability.

Polypropylene, having excellent physical and chemical properties, has been widely employed for electric appliances, materials for buildings, parts for automobiles and parts for various machinery.

For an application where high rigidity is required, various fillers are incorporated in a polypropylene; in cases where especially high rigidity is required, polypropylene incorporating a glass fiber is used.

However, such a glass fiber reinforced polypropylene has a drawback in that a molded article thereof has bad touch and appearance due to embossment of the glass fiber, no gloss, roughness, etc. on the surface thereof and that the molded article shows low shock-resistance, is liable to deform (occurence of warping) and exhibits inferior coating-ability, thus being of low commercial value.

Thus, for the purpose of improving the appearance of the molded article of a glass fiber reinforced polypropylene, a resin composition in which a polypropylene graft-modified with maleic anhydride is used as the polypropylene has been proposed (Japanese Patent Publication No. 10265/1976). However, this resin also has low shock-resistance and is liable to deform, thus being of low commercial value.

Then, in order to improve the shock-resistance and the deforming property of a glass fiber reinforced polypropylene, a composition incorporating with a linear amorphous rubber-like polymer has been proposed (Japanese Patent Publication No. 8054/1977). However, this composition still has drawbacks in that the heat-resistant rigidity is low, and the shock-resistance and coating-ability are not sufficient.

SUMMARY OF THE INVENTION

An object of the present invention is to provide a glass fiber reinforced polypropylene composition which is excellent in heat-resistant rigidity (i.e., excellent resistance to loss of rigidity at elevated temperature), shock-resistance and coating-ability.

The present invention provides a glass fiber reinforced polypropylene composition comprising 50 to 85% by weight of a crystalline ethylene-propylene block copolymer which has been graft-modified with itaconic anhydride, 5 to 45% by weight of a glass fiber and 3 to 20% by weight of a polyolefin type rubber which has been graft-modified by an unsaturated carboxylic acid (100% by weight in total).

In the glass fiber reinforced polypropylene composition according to the present invention, the heat-resistant rigidity has been lowered little, and the rigidity at elevated temperature, shock resistance and coating-ability may be greatly improved.

Further, a glass fiber reinforced polypropylene composition which can furnish a molded article with an excellent appearance may be obtained according to the present invention.

DESCRIPTION OF THE PREFERRED EMBODIMENTS

In the present invention, it is required to use, as the polypropylene, a crystalline ethylene-propylene block copolymer which has been graft-modified with itaconic anhydride.

As the above-mentioned crystalline ethylene-propylene block copolymer, there may suitably be used one having an ethylene content of 2 to 15% by weight and an MFR (Melt Flow Rate Index) of 0.05 to 30 g/10 min. The crystalline ethylene-propylene block copolymer may be in any one of the forms of powder, granule and pellet. A crystalline ethylene-propylene block copolymer may be graft-modified with itaconic anhydride preferably by mixing while heating 100 parts by weight of a crystalline ethylene-propylene block copolymer, 0.1 to 3 parts by weight of itaconic anhydride and 0.05 to 1 part by weight of an organic peroxide. As the above-mentioned organic peroxide, there may preferably be used an organic peroxide whose decomposition temperature to obtain one minute half-life is not lower than the melting point of the crystalline ethylene-propylene block copolymer to be used but not exceeding 200° C. Such organic peroxides may include t-butyl peroxybenzoate, t-butyl peroxymaleic acid, t-butyl peroxylaurate, cyclohexanone peroxide, 2,5-dimethyl-2,5-di(benzoylperoxy)hexane, t-butyl peroxyacetate, t-butyl peroxybenzoate, methylethylketone peroxide, dicumyl peroxide, 2,5-dimethyl-2,5-di(t-butylperoxy)hexane, t-butyl cumyl peroxide, di-t-butyl peroxide, 2,5-dimethyl-2,5-di(t-butyl peroxy)hexine(3), etc. The above-mentioned graft-modification (i.e., the reaction) may suitably be performed by blending the above-mentioned components, followed by melt-kneading in nitrogen or air (in the presence of air) for around 1 to 20 min. by using an extruding machine.

An ethylene-propylene block copolymer which has been graft-modified with itaconic anhydride may preferably have an itaconic anhydride content of 0.05 to 3% by weight and an MFR of 1 to 100 g/10 min. A part of the itaconic anhydride-modified ethylene-propylene block copolymer may be replaced by an unmodified crystalline ethylene-propylene block copolymer. In this case, the content of the itaconic anhydride in the total amount of both copolymers as well as MFR may preferably be within the above-mentioned range.

Although the shape and the length of glass fiber to be used in the present invention is not particularly limited, it may be used, for example, in the form of chopped strand or of roving which is cut into 2 to 10 mm lengths. A glass fiber whose surface has been treated by such a coupling agent as aminosilane compound, epoxysilane compound, vinylsilane compound or methacrylosilane compound may suitably be used. The proportion of glass fiber to be used in the glass fiber reinforced polypropylene of the present invention is 5 to 45% by weight, preferably 20 to 30% by weight, of the total amount of the crylstalline ethylene-propylene block copolymer which has been graft-modified with itaconic anhydride, the glass fiber and the polyolefin rubber which has been graft-modified with an unsaturated carboxylic acid. When the proportion of the employed glass fiber is less than 5% by weight, the reinforcing effect is not sufficient, the heat distortion temperature and heat-resistant rigidity will be lowered; when it is more than 45% by weight, the flowability (moldability) of the composition may be lowered to worsen the appearance of the molded article.

In the present invention, it is necessary to use a polyolefin rubber which has been graft-modified with an unsaturated carboxylic acid as a polyolefin type rubber. The employment of a crystalline ethylene-propylene block copolymer which has been graft-modified with itaconic anhydride in combination with the above-mentioned polyolefin rubber which has been graft-modified with an unsaturated carboxylic acid makes it possible to obtain a glass fiber reinforced polypropylene composition having excellent rigidity at elevated temperature, shock-resistance, appearance and coating-ability.

As the above-mentioned polyolefin rubber, ethylene-propylene copolymer rubber (EPR), ethylene-propylene-unconjugated-diene copolymer rubber (EPDM), ethylene-butene-1 copolymer rubber, each having an ethylene content of about 30 to 80% may suitably be used. As an unconjugated diene, there may be used, for example, dicyclopentadiene, 1,4-hexadiene, cyclooctadiene, methylene norbornene, ethylidenenorbornene, etc. As unsaturated carboxylic acids, which are monomers to be grafted, there may preferably be used, for example, maleic anhydride, itaconic anhydride and acrylic acid. The introduction of such unsaturated carboxylic acid by means of graft-modification (-reaction) is not especially limited, and it may be performed according to a conventional method such as the solution method, the kneading method, etc. where an organic peroxide etc. is employed. As examples of the organic peroxide to be used, there may be mentioned those used for the graft-modification of the above-mentioned crystalline ethylene-propylene block copolymer. The unsaturated carboxylic acid may preferably be used for graft-modification at a proportion within the range of 0.05 to 3.5% by weight relative to the polyolefin type rubber. Other reaction conditions and specific reaction procedures relating to the graft-modification of the polyolefin type rubber may easily be set up according to a method known per se. The graft-modulated polyolefin type rubber may be obtained by means of a method known per se after completion of the graft-modification (-reaction). MFR (230° C., 2160 g) of the graft-modified polyolefin rubber to be used in the composition of the glass fiber reinforced polypropylene of the present invention may preferably be 0.1 to 10 g/min.

The content of an unsaturated carboxylic acid in the graft-modified polyolefin rubber may preferably be within the range of 0.05 to 3% by weight. A part of the graft-modified polyolefin rubber may be replaced by an unmodified rubber. In this case, the content of the unsaturated carboxylic acid in the total amount of both rubbers as well as MFR may preferably be within the range mentioned above.

The proportion of the graft-modified polyolefin rubber to be used in the glass fiber reinforced polypropylene composition of the present invention is 3 to 20% by weight, preferably 5 to 15% by weight of the total amount of the crystalline ethylene-propylene block copolymer which has been graft-modified by itaconic anhydride, the glass fibers and the graft-modified polyolefin type rubber. When the proportion of the graft-modified polyolefin rubber to be used is less than 3% by weight, the shock-resistance, the coating-ability and the appearance may be lowered (deteriorated). On the other hand when it is more than 20% by weight, the heat-resistant rigidity of a molded article may be lowered.

A glass fiber reinforced polypropylene composition of the present invention may contain, in addition to the above-mentioned components, a pigment; an anti-oxidant; a UV absorber; a flame retarder; an antistatic agent; a lubricant, a nucleating agent; an organic/inorganic filler such as talc, calcium, carbonate, mica, barium sulfate, fibrous magnesium oxysulfate, (calcined) kaolin, silica, magnesium silicate, zeolite, carbon fiber, aromatic polyamide fiber, potassium titanate fiber, asbestos fiber, boron fiber, etc. and a thermoplastic resin such as polyethylene, nylon, polycarbonate, etc. within the extent that they will not give a marked influence on the physical properties.

The glass fiber reinforced polypropylene composition of the present invention, when the glass fiber used is in the form of chopped strand, may be obtained, for example, by mixing the above-mentioned components in an extruder, Banbury mixer, intensive mixer or the like, preferably by melt-mixing the crystalline ethylene-propylene block copolymer which has been graft-modified with itaconic anhydride with the graft-modified polyolefin rubber in a double shaft kneader to knead under melting, followed by further kneading the resulting melt polymeric mixture with the glass fiber by means of a single shaft extruder. According to this method the glass fiber may be cut in a small amount and hence a favorable result may be obtained.

On the other hand, the glass fiber reinforced polypropylene composition of the present invention, when the glass fiber used is in the form of roving strand, may be obtained, for example, by preliminarily mixing homogeneously the above-mentioned components except for the glass fiber by use of a mixer such as Henschel mixer, supermixer, tumbler mixer, etc., followed by kneading while melting by an extruder and introducing glass fiber through a vent or a dice portion of the extruder into the melt polymer mixture.

The glass fiber reinforced polypropylene composition of the present invention is excellent in rigidity at elevated temperature, shock-resistance, appearance and coating-ability. It hardly has an odor and there is almost no warping in a molded article which has been molded by injection molding. Thus, the glass fiber reinforced composition of the present invention is suitably applied for injection-molding of parts for automobiles, parts for electric appliances, materials for buildings and other industrial parts, etc. in which higher heat-resistant rigidity, shock-resistance, coating-ability and excellent appearance are required.

Examples and Comparative examples are given below. In the following examples, part(s) means part(s) by weight.

In each Example, MFR (230° C.) of polypropylene was measured according to JISK 7210; evaluation of the physical characteristics was performed on the injection-molded test pieces; tensile yield point strength (TY) was measured according to JISK 7118; flexural modulus (FM) (23° C., 110° C.), to JISK 7208; flexural strength (FS), to JISK 7208; Izod, to JISK 7110; and heat distortion temperature, to JISK 7207 under a load of 18.5 kg/cm$^2$.

For measurement of the deformation of a molded article, test pieces of 2 mmt × 100 mm $\phi$ were used. The deformation is indicated by the following equation (calculation) when the test pieces were left at rest on a surface plate.

$$\text{Deformation (\%)} = \frac{a(mm) + b(mm)}{2 \times 100} \times 100$$

a and b: Distances from the surface plate to both ends of the test piece (deformation) (mm)

The appearance of the molded articles was evaluated with respect to the presence of luster, roughness and embossing of glass fiber, and classified into "Good", "Slightly unsatisfactory" and "Unsatisfactory". Further, with respect to smell, it is classified into "No smell", "Slight smell" and "Smell" in Tables 3 and 4.

feeding portion of the single-shaft extruder (temperature for mixing: 200° to 280° C.)] to obtain glass fiber reinforced polypropylene compositions. The results are summarized in Table 2.

TABLE 1

|  | Grafted maleic anhydride (%) | Propylene content (%) | MFR (230° C.) |
| --- | --- | --- | --- |
| MEPR - A | 1.0 | 27 | 0.4 g/10 min |
| MEPR - B | 1.0 | 27 | 1.0 g/10 min |
| MEPR - C | 1.0 | 27 | 6.0 g/10 min |
| EPR | 0 | 27 | 0.7 g/10 min |

TABLE 2

|  | Example 1 | Example 2 | Example 3 | Example 4 | Example 5 |
| --- | --- | --- | --- | --- | --- |
| Formulation |  |  |  |  |  |
| MPP - 1 (%) | 66 | 63 | 60 | 66 | 66 |
| GF - 1 (%) | 25 | 25 | 25 | 25 | 25 |
| EPR type | MEPR - B | MEPR - B | MEPR - B | MEPR - A | MEPR - C |
| (% by weight) | 9 | 12 | 15 | 9 | 9 |
| Physical properties |  |  |  |  |  |
| TY (Kg/cm$^2$) | 720 | 690 | 660 | 730 | 710 |
| FM (23° C.) (Kg/cm$^2$) | 37000 | 36000 | 35000 | 39000 | 37000 |
| FM (110° C.) (Kg/cm$^2$) | 16000 | 15000 | 15000 | 17000 | 16000 |
| FS (110° C.) (Kg/cm$^2$) | 200 | 190 | 180 | 230 | 200 |
| Izod (Kg · cm/cm) | 25 | 29 | 36 | 23 | 25 |
| Deformation (%) | 3.5 | 3 | 0.8 | 3.5 | 3.5 |
| Heat Distortion Temperature (°C.) | 137 | 135 | 132 | 139 | 136 |
| Appearance | Good | Good | Good | Good | Good |
| Total evaluation | Good | Good | Good | Good | Good |

EXAMPLES 1-5

To 100 parts of crystalline ethylene-propylene block copolymer having an MFR of 1 g/10 minutes and ethylene content of 7% were admixed with 0.5 parts of itaconic anhydride and 0.15 part of t-butyl peroxybenzoate in a tumbler mixer, followed by melt-kneading in a single-shaft extruder at 200° C. for 2 minutes to obtain a polypropylene which has been graft-modified with itaconic anhydride (MPP-1).

The thus obtained graft-modified polypropylene (MPP-1), the polyolefin rubber graft-modified with maleic anhydride shown in Table 1 which had been obtained by graft-modification in an orthodichlorobenzene in the presence of dicumyl peroxide as catalyst at 135° C. for 4 hr. and the chopped strand glass fiber (GF-1) having its surface treated with an aminosilane (amount of treatment: 0.1% by weight) having a diameter of 10μ and a length of 6 mm. at the formulation proportion as shown in Table 2 [at a formulation proportion of 0.2 PHR of Irganox 1010 (trade name, available from Ciba-Geigy, Japan) and 0.1 PHR of BHT (relative to MPP)] were mixed by means of a continuous two-step double-shaft extruder [Step 1: mixing of polymer component—2FCM (200° to 240° C.); Step 2: mixing of polymer mixture with a glass fiber by a single-shaft extruder, and a glass fiber is supplied from the

EXAMPLE 6

A glass fiber reinforced polypropylene composition was obtained in the same manner as in Example 1, except that a polypropylene graft-modified with itaconic anhydride (used amount: 0.5 PHR) MPP-2, which had been obtained in the same manner as that of MPP-1 of Example 1 except for the use of a crystalline ethylene propylene block copolymer having an MFR of 0.35 g/min. and ethylene content of 7% in place of MPP-1, was mixed at a proportion as shown in Table 3, with MEPR-B described in Table 1 and a chopped strand glass fiber having its surface treated by an aminosilane (amount of treatment: 0.2% by weight) and having a diameter of 13μ and a length of 6 mm (GF-2). The results are summarized in Table 3.

COMPARATIVE EXAMPLES 1-5

Graft-modified polypropylenes were obtained in the same manner as in Example 6 except that modifying agents shown in Table 3 were used instead of itaconic anhydride. By use of the thus prepared graft-modified polypropylenes, the process of Example 6 was repeated except that the formulation proportion of each component was set up as in Table 3. The results are also summarized in Table 3.

TABLE 3

|  | Example 6 | Comparative Example 1 | Comparative Example 2 | Comparative Example 3 | Comparative Example 4 | Comparative Example 5 |
| --- | --- | --- | --- | --- | --- | --- |
| Formulation |  |  |  |  |  |  |
| MPP Type of modifying agent | Itaconic anhydride | Itaconic acid | Maleic anhydride | γ-Methacryl-oxypropyltri-methoxysilane | Glycidyl methacrylate | Maleic anhydride |
| MPP (% by weight) | 75 | 75 | 75 | 75 | 75 | 66 |
| GF - 2 (% by weight) | 20 | 20 | 20 | 20 | 20 | 25 |
| MEPR - B (% by weight) | 5 | 5 | 5 | 5 | 5 | 15* |

TABLE 3-continued

|  | Example 6 | Comparative Example 1 | Comparative Example 2 | Comparative Example 3 | Comparative Example 4 | Comparative Example 5 |
|---|---|---|---|---|---|---|
| Physical properties | | | | | | |
| TY (Kg/cm$^2$) | 640 | 420 | 390 | 480 | 310 | 380 |
| FM (23° C.) (Kg/cm$^2$) | 39000 | 34000 | 34000 | 33000 | 32000 | 33000 |
| FM (110° C.) (Kg/cm$^2$) | 15000 | 12000 | 12000 | 12000 | 11000 | 11000 |
| FS (110° C.) (Kg/cm$^2$) | 210 | 180 | 180 | 170 | 170 | 170 |
| Izod (Kg · cm/cm) | 22 | 8 | 15 | 15 | 10 | 10 |
| Deformation (%) | 3.8 | 4.0 | 4.3 | 6.2 | 4.2 | 1.3 |
| Heat Distortion Temperature (°C.) | 135 | 126 | 122 | 125 | 85 | 120 |
| Appearance | Good appearance | Good appearance | Good appearance | Bad appearance, lusterless and rough | Good appearance | Good appearance |
| Smell | No smell | No smell | Smell | No smell | Smell | Smell |
| Total evaluation | Good | Unsatisfactory | Unsatisfactory | Unsatisfactory | Unsatisfactory | Unsatisfactory |

*EPR in Table 1 was used.

EXAMPLES 7–11

Glass fiber reinforced polypropylene compositions were obtained in the same manner as in Example 6 except that, instead of MEPR-B, a graft-modified EPR (containing 27% by weight of propylene) which had been graft-modified by modifying agents of the type and the amount shown in Table 4 having been obtained by graft-modification in an orthodichlorobenzene in the presence of a dicumyl peroxide as a catalyst at 135° C. for 4 hr. was used. The results are also shown in Table 4.

TABLE 4

|  | Example 7 | Example 8 | Example 9 | Example 10 | Example 11 |
|---|---|---|---|---|---|
| Formulation | | | | | |
| MPP (% by weight) | 75 | 75 | 75 | 75 | 75 |
| GF - 2 (% by weight) | 20 | 20 | 20 | 20 | 20 |
| Type of MEPR modifying agent | Acrylic acid | Acrylic acid | Acrylic acid | Acrylic acid | Itaconic anhydride |
| Grafting rate (%) | 0.3 | 1 | 2 | 3 | 1 |
| MFR (230° C.) | 3.3 | 2.7 | 2.2 | 1.7 | 2.5 |
| (% by weight) | 5 | 5 | 5 | 5 | 5 |
| Physical properties | | | | | |
| TY (Kg/cm$^2$) | 630 | 640 | 630 | 630 | 640 |
| FM (23° C.) (Kg/cm$^2$) | 37000 | 37000 | 37000 | 37000 | 40000 |
| FM (110° C.) (Kg/cm$^2$) | 16000 | 16000 | 16000 | 16000 | 17000 |
| FS (110° C.) (Kg/cm$^2$) | 204 | 204 | 206 | 209 | 213 |
| Izod (Kg · cm/cm) | 22 | 22 | 21 | 19 | 24 |
| Deformation (%) | 3.6 | 3.7 | 3.8 | 3.8 | 3.6 |
| Heat Distortion Temperature (°C.) | 135 | 134 | 134 | 135 | 136 |
| Appearance | Good appearance | Good appearance | Good appearance | Good appearance | Good appearance |
| Smell | No smell | No smell | No smell | No smell | No smell |
| Total evaluation | Good | Good | Good | Good | Good |

EXAMPLES 12–13

Glass fiber reinforced polypropylene compositions were obtained in the same manner as in Example 6 except that, instead of MPP-2, a graft-modified polypropylene which had been graft-modified by itaconic anhydride in an amount as shown in Table 5. The results are summarized in Table 5.

TABLE 5

|  | Example 12 | Example 13 |
|---|---|---|
| Formulation | | |
| MPP (amount of itaconic anhydride used for graft-modification) (PHR) | 0.2 | 1.0 |
| (% by weight) | 75 | 75 |
| GF - 2 (% by weight) | 20 | 20 |
| MEPR - B (% by weight) | 5 | 5 |
| Physical properties | | |
| TY (Kg/cm$^2$) | 630 | 640 |
| FM (23° C.) (Kg/cm$^2$) | 39000 | 39000 |
| FM (110° C.) (Kg/cm$^2$) | 15000 | 15000 |
| FS (110° C.) (Kg/cm$^2$) | 203 | 210 |
| Izod (Kg · cm/cm) | 22 | 24 |
| Deformation (%) | 3.5 | 3.6 |
| Heat Distortion Temperature (°C.) | 135 | 133 |
| Appearance | Good appearance | Good appearance |
| Smell | No smell | No smell |
| Total evaluation | Good | Good |

COATING TEST

Coating Test was carried out in the following manner on the molded articles of the glass fiber reinforced polypropylene compositions obtained in Examples 1–5.

Coating material: Planet PP-2 produced by Origin Denki K.K.

Thickness of coat film: 20μ or 40μ

Peeling Test: Peeling test by means of checkered adhesive tape (cellophane tape)

As the result of the test, no peeling was observed with the molded articles obtained from the glass fiber reinforced polypropylene compositions in Examples 1–5 both in thickness of 20μ and 40μ (rate of residual coat film: 100%).

We claim:

1. A glass fiber reinforced polypropylene composition comprising 50 to 85% by weight of a crystalline ethylene-propylene block copolymer which has been graft-modified with itaconic anhydride, 5 to 45% by weight of a glass fiber and 3 to 20% by weight of a polyolefin rubber which has been graft-modified with an unsaturated carboxylic acid (100% by weight in total).

2. The glass fiber reinforced polypropylene composition according to claim 1, wherein said crystalline ethylene-propylene block copolymer has an ethylene content of 2 to 15% by weight and an MFR (Melt Flow Rate Index) of 0.05 to 30 g/10 min.

3. The glass fiber reinforced polypropylene composition according to claim 1, wherein said crystalline ethylene-propylene block copolymer is graft-modified with itaconic anhydride by mixing while heating 100 parts by weight of a crystalline ethylene-propylene block copolymer, 0.1 to 3 parts by weight of an itaconic anhydride and 0.05 to 1 part by weight of an organic peroxide.

4. The glass fiber reinforced polypropylene composition according to claim 3, wherein said organic peroxide is an organic peroxide whose decomposition temperature to obtain one minute half-life is not lower than the melting point of the crystalline ethylene-propylene block copolymer to be used but not exceeding 200° C.

5. The glass fiber reinforced polypropylene composition according to claim 4, wherein said organic peroxide is t-butyl peroxybenzoate, t-butyl peroxymaleic acid, t-butyl peroxylaurate, cyclohexanone peroxide, 2,5-dimethyl-2,5-di(benzoylperoxy)hexane, t-butyl peroxyacetate, t-butyl peroxybenzoate, methylethylketone peroxide, dicumyl peroxide, 2,5-dimethyl-2,5-di(t-butylperoxy)hexane, t-butyl cumyl peroxide, di-t-butyl peroxide or 2,5-dimethyl-2,5-di(t-butyl peroxy)hexine(3).

6. The glass fiber reinforced polypropylene composition according to claim 5, wherein said organic peroxide is t-butyl peroxybenzoate.

7. The glass fiber reinforced polypropylene composition according to claim 1, wherein said glass fiber is in the form of chopped strand or of roving which is cut into 2 to 10 mm lengths.

8. The glass fiber reinforced polypropylene composition according to claim 1, wherein the proportion of said glass fiber is 20 to 30% by weight of the total amount of the crystalline ethylene-propylene block copolymer.

9. The glass fiber reinforced polypropylene composition according to claim 1, wherein said polyolefin rubber is ethylene-propylene copolymer rubber (EPR), ethylene-propylene-unconjugated-diene copolymer rubber (EPDM) or ethylene-butene-1 copolymer rubber, each having an ethylene content of about 30 to 80%.

10. The glass fiber reinforced polypropylene composition according to claim 1, wherein said unsaturated carboxylic acid is maleic anhydride, itaconic anhydride or acrylic acid.

11. The glass fiber reinforced polypropylene composition according to claim 1, wherein the MFR (230° C., 2160 g) of the said graft-modified polyolefin rubber is 0.1 to 10 g/min.

12. The glass fiber reinforced polypropylene composition according to claim 11, wherein the proportion of said graft-modified polyolefin rubber is 5 to 15% by weight of the total amount of the crystalline ethylene-propylene block copolymer.

13. The glass fiber reinforced polypropylene composition according to claim 2, wherein
said glass fiber is in the form of chopped strand or of roving which is cut into 2 to 10 mm lengths,
said polyolefin rubber is ethylene-propylene copolymer rubber (EPR), ethylene-propylene-unconjugated-diene copolymer rubber (EPDM) or ethylene-butene-1 copolymer rubber, each having an ethylene content of about 30 to 80%, and
said unsaturated carboxylic acid is maleic anhydride, itaconic anhydride or acrylic acid.

14. The glass fiber reinforced polypropylene composition according to claim 13, wherein
said crystalline ethylene-propylene block copolymer is graft-modified with itaconic anhydride by mixing while heating 100 parts by weight of a crystalline ethylene-propylene block copolymer, 0.1 to 3 parts by weight of an itaconic anhydride and 0.05 to 1 part by weight of an organic peroxide,
said organic peroxide is an organic peroxide whose decomposition temperature to obtain one minute half-life is not lower than the melting point of the crystalline ethylene-propylene block copolymer to be used but not exceeding 200° C., and
the MFR (230° C., 2160 g) of the said graft-modified polyolefin rubber is 0.1 to 10 g/min.

15. The glass fiber reinforced polypropylene composition according to claim 14, wherein
the proportion of said glass fiber is 20 to 30% by weight of the total amount of the crystalline ethylene-propylene block copolymer, and the proportion of said graft-modified polyolefin rubber is 5 to 15% by weight of the total amount of the crystalline ethylene-propylene block copolymer.

16. The glass fiber reinforced polypropylene composition according to claim 15, wherein said organic peroxide is t-butyl peroxybenzoate, t-butyl peroxymaleic acid, t-butyl peroxylaurate, cyclohexanone peroxide, 2,5-dimethyl-2,5-di(benzoylperoxy)hexane, t-butyl peroxyacetate, t-butyl peroxybenzoate, methylethylketone peroxide, dicumyl peroxide, 2,5-dimethyl-2,5-di(t-butylperoxy)hexane, t-butyl cumyl peroxide, di-t-butyl peroxide or 2,5-dimethyl-2,5-di(t-butyl peroxy)hexine(3).

17. The glass fiber reinforced polypropylene composition according to claim 15, wherein said organic peroxide is t-butyl peroxybenzoate.

18. The glass fiber reinforced polypropylene composition according to claim 3, wherein
the proportion of said glass fiber is 20 to 30% by weight of the total amount of the crystalline ethylene-propylene block copolymer, and the proportion of said graft-modified polyolefin rubber is 5 to 15% by weight of the total amount of the crystalline ethylene-propylene block copolymer.

19. The glass fiber reinforced polypropylene composition according to claim 18, wherein
said organic peroxide is an organic peroxide whose decomposition temperature to obtain one minute half-life is not lower than the melting point of the crystalline ethylene-propylene block copolymer to be used but not exceeding 200° C., and the MFR (230° C., 2160 g) of the said graft-modified polyolefin rubber is 0.1 to 10 g/min.

20. The glass fiber reinforced polypropylene composition according to claim 19, wherein
said crystalline ethylene-propylene block copolymer has an ethylene content of 2 to 15% by weight and an MFR (Melt Flow Rate Index) of 0.05 to 30 g/10 min.,
the proportion of said graft-modified polyolefin rubber is 5 to 15% by weight of the total amount of the crystalline ethylene-propylene block copolymer, and
said organic peroxide is t-butyl peroxybenzoate.

* * * * *